United States Patent [19]

Jones et al.

[11] Patent Number: 4,498,748
[45] Date of Patent: Feb. 12, 1985

[54] CAMERA FOR PHOTOGRAPHING SCALE MODELS

[75] Inventors: Peter W. J. Jones, Belmont; William T. Plummer, Concord; Dennis W. Purcell, Medford, all of Mass.

[73] Assignee: Polaroid Corporation, Cambridge, Mass.

[21] Appl. No.: 446,598

[22] Filed: Dec. 3, 1982

[51] Int. Cl.$^3$ ............................................ G03B 17/48
[52] U.S. Cl. ...................................... 354/79; 354/81; 354/150
[58] Field of Search ............... 354/62, 63, 79, 81, 354/150, 290, 292; 352/93, 94; 358/100

[56] References Cited

U.S. PATENT DOCUMENTS

| | | |
|---|---|---|
| 3,472,578 | 10/1969 | Price . |
| 3,495,516 | 2/1970 | Henderson . |
| 3,720,145 | 3/1973 | Johnson et al. . |
| 3,833,291 | 9/1974 | Samuelson . |
| 4,114,167 | 9/1978 | McKee .................................. 354/81 |
| 4,195,922 | 4/1980 | Hajnal ................................... 354/79 |
| 4,226,518 | 10/1980 | Kellner ................................. 354/79 |

FOREIGN PATENT DOCUMENTS 1232810  5/1971  United Kingdom .................. 354/79
650041   4/1979  U.S.S.R. ............................... 354/150

OTHER PUBLICATIONS

*The Focal Encyclopedia of Photography*, vol. II, p. 967, Focal Press (1965).
Neblette et al., *Photographic Lenses*, Morgan & Morgan, Inc., N.Y., 1973, pp. 120, 121.

*Primary Examiner*—John Gonzales
*Attorney, Agent, or Firm*—Francis J. Caufield

[57] ABSTRACT

A camera for photographing architectural scale models and the like to obtain photographs having natural full-scale perspective. The camera includes a film back adapted to receive panchromatic, preferably, self-processable type film. From the film back extends a relatively long body which tapers rather sharply from the film back to a narrow pedestal-like base upon which the camera stands and which allows easy access to model features. An optical system resides in the base and includes a long focal length positive lens and pinhole adapted to the long tapered body and an afocal, simple reversed Galilean telescope which serves to establish the camera field of view. Chromatic aberrations which might otherwise cause multiple images due to the long camera optical path are eliminated by appropriate filtering.

12 Claims, 5 Drawing Figures

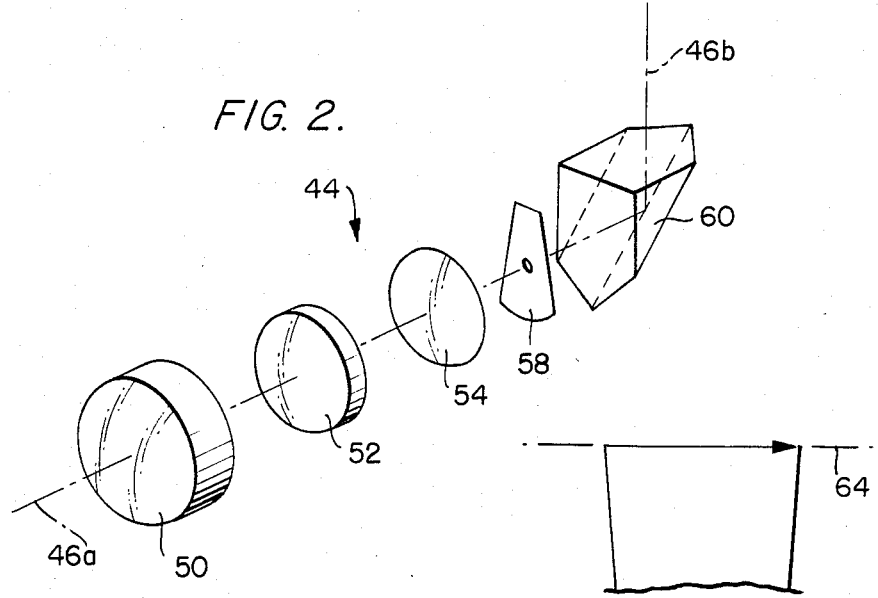
FIG. 2.
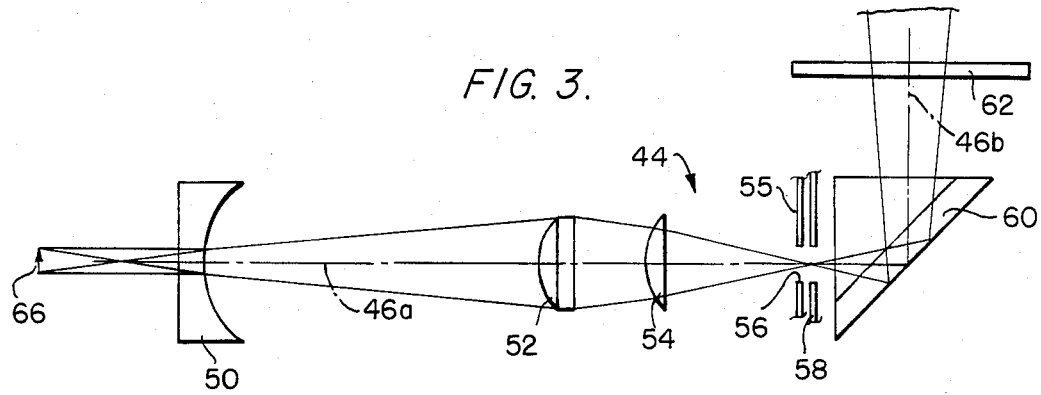
FIG. 3.
FIG. 4.
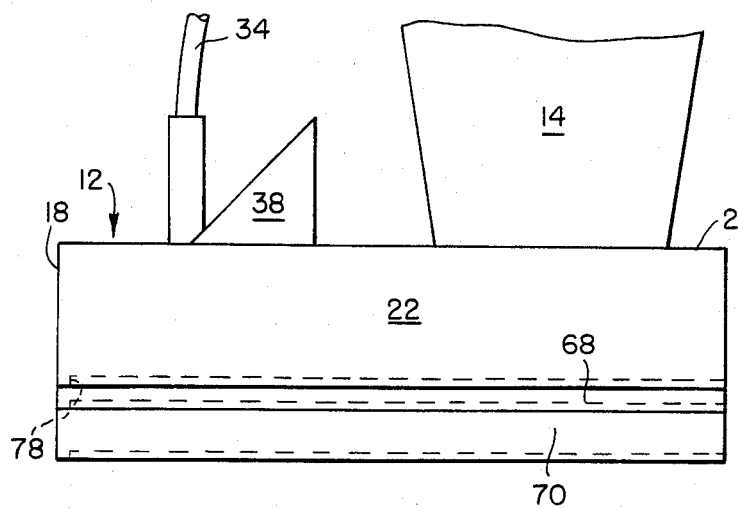
FIG. 5.
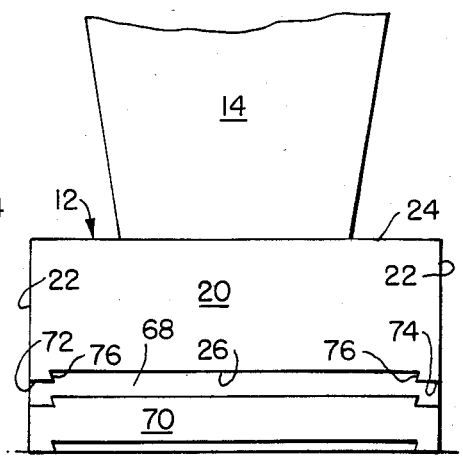

CAMERA FOR PHOTOGRAPHING SCALE MODELS

BACKGROUND OF THE INVENTION

This invention relates to photographic apparatus and, more particularly, to a camera for photographing scale models such as architectural models and the like.

Photographs of architectural scale models are useful in the design and promotion of buildings, room layouts, decorating schemes, and the like, because they give visual impressions of prospective full-scale structures using inexpensive models which can portray alternative layouts and designs. Recent increased popularity in doll houses amoung adult hobbyists, for example, has also provided a basis for a market in low-cost cameras capable of photographing individual room of doll houses as an adjunct to the hobby.

In order to obtain a natural full-scale perspective in a photograph of an architectural scale model, the model must be photographed from distances and at eye levels proportionate to those providing the same visual impression that one would perceive when viewing or photographing a full-scale version of the model. To illustrate, in a model built to the scale of 1/10 inch equals one foot, the eye level of a person represented in the model will approximate one-half inch. Correspondingly, the dimensions of all other objects, such as the area and ceiling height of rooms, doorways, windows and furniture, for example, will be similarly reduced by the same scale. Thus, a photograph in which all objects in the scale model appear to be the same as they would at full scale would require positioning of the camera objective relative to objects in the model in a manner to provide an image which might be observed by the equivalent of a scale person.

Optical parameters such as depth of focus, angular field of view, subject illumination, and the like, must also accommodate the scale of the model. Depth of focus is critical particularly at the near range of camera-to-subject distances because of the relatively short actual camera/subject distance at the scale of the model. Similarly, the angular field of view is critical to the achievement of a photograph resembling an actual photograph at full scale. Illumination also becomes a problem particularly in isolated areas of a model in the absence of elaborate complex and expensive lighting systems.

In addition to the problems associated with meeting optical requirements for photographing scale models, a camera designed for such use requires physical dimensioning capable of access to portions of the model while at the same time providing an accommodation for operation. In this respect, the objective lens supporting structure should be of the size to fit within such openings as doors or windows of the model and to orient the objective lens axis at the proper scale height as mentioned above. On the other hand, operating components such as a shutter actuator and a viewfinder eyepiece must be capable of positioning to enable access by an adult person.

SUMMARY OF THE PRESENT INVENTION

In accordance with the present invention, a highly effective, low-cost camera is provided for photographing scale models using conventional film formats. The camera is generally characterized by a vertically oriented, elongated, tapered housing supported on a narrow pedestal-like base which contains an optical system arranged along an optical axis. A film back is supported at the top of the housing and carries an eyepiece of a periscope-type viewfinder so that an operator may frame the subject to be photographed having visual access at the elevated film back.

The optical system contained in the pedestal or base features a simple, reversed Galilean-type telescope followed by a long focal length objective lens positioned forwardly of a small fixed aperture and capping shutter. Light emerging from the aperture is folded to be aligned with the axis of the vertically-oriented elongated housing and to present the image of an object being photographed at a film plane located in the film back and near the upper end of the housing. To avoid any multi-image effects due to chromatic aberrations characteristic of simple Galilean-type telescopic lens assemblies, the optical path is provided with a filter to allow only a relatively narrow band of the visible spectrum to reach the film plane.

The camera is actuated by a cable-type shutter release extending to the pedestal or base. A shutter timing device is located on the film back to be directly accessible to the camera operator. The camera is equipped with a tripod socket for support from a tripod boom but is preferably supported directly on the pedestal which may be equipped with removable weighted shims to adjust the height of the entrance end of the objective system optical axis relative to the subject to be photographed.

A principal object of the present invention is to provide an effective, low-cost camera for providing realistic photographs of small-scale models.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 2 is an exploded perspective view illustrating the objective lens system of the present invention;

FIG. 3 is a schematic view illustrating the optical path of the camera;

FIG. 4 is a fragmentary side elevation of the pedestal or base of the camera; and FIG. 5 is an end elevation of the pedestal illustrated in FIG. 4.

DETAILED DESCRIPTION OF THE PREFERRED EMBODIMENT

Figure 1:
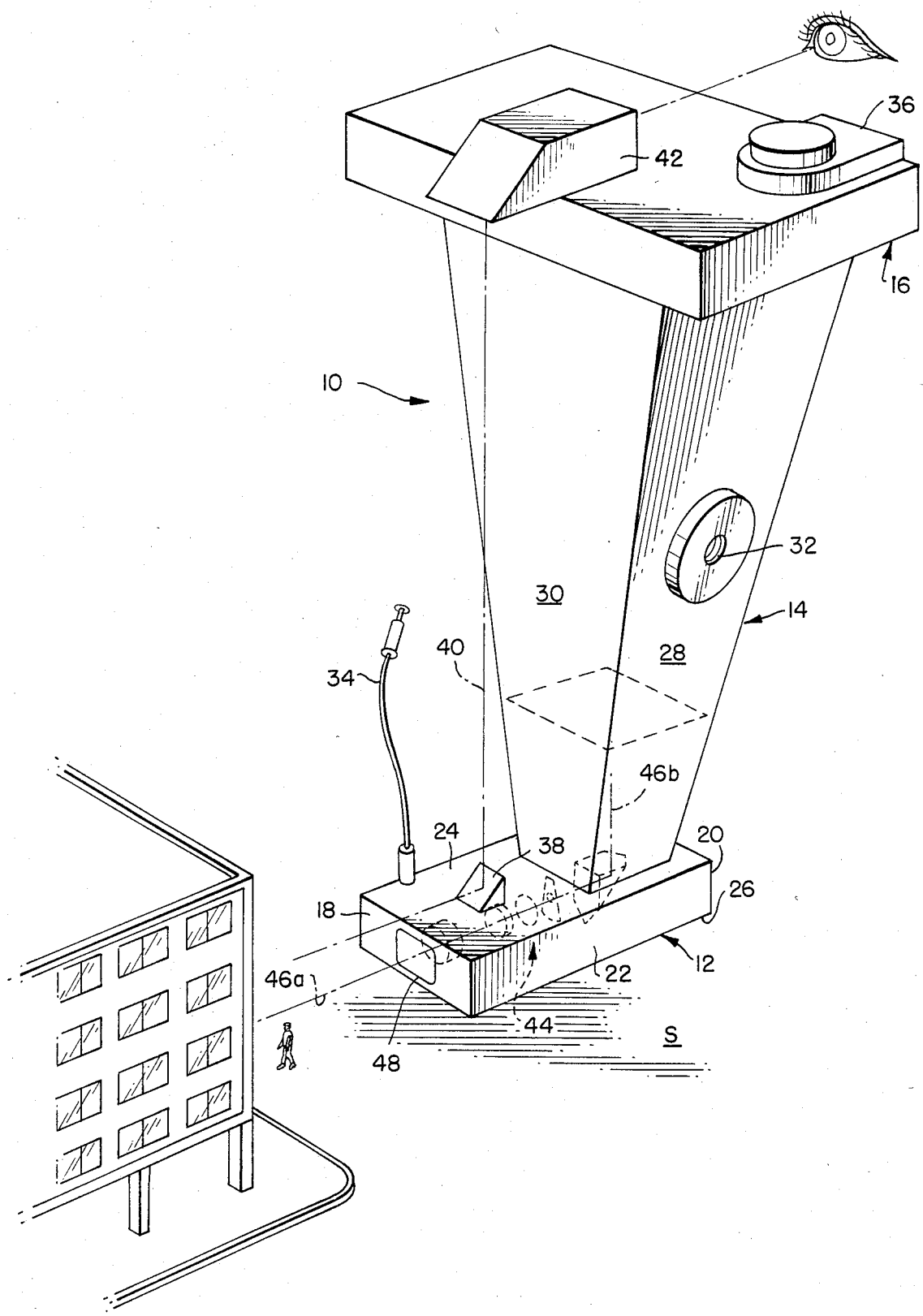
FIG. 1 is a perspective view illustrating the camera of the present invention.

In FIG. 1 of the drawings, the camera of the present invention is generally designed by the reference numeral 10 and shown to include a pedestal-like base 12, an upstanding housing 14 supported on the base 12, and a film back 16 at the top of the housing 14. The base 12 has an exterior configuration in the form of a rectangular parallelepiped to establish front, back, side, top and bottom walls 18, 20, 22, 24 and 26, respectively. The housing 14 is shaped as a frustrum of an inverted pyramid having mutually perpendicular, trapezoidal side and end wall 28 and 30, respectively, which diverge upwardly from the juncture of the housing bottom with the top wall 24 of the base 12 to a juncture between the top of the housing and the bottom of the film pack. It will be appreciated that the base 12, the housing 14 and the film back 16 establish a light-tight enclosure. Also, and to facilitate an understanding of camera size or dimensions, the overall height of the camera 10 approximates 13 inches (33 cm). The dimensions of the base 12 and the film back may vary in practice but are in the general proportions represented in FIG. 1.

Although the film back 16 is represented in FIG. 1 simply as a rectangular parallelepiped, the film back 16 will, in practice, include appropriate film loading and unloading openings (not shown). In particular, it is preferred that the film back 16 be of a well-known design for receiving instant or self-developing film packs of the type supplied by Polaroid Corporation, Cambridge, Mass. Such film backs are now well known and operate either to eject automatically or to provide a facility for withdrawing film units immediately after they are exposed for development by diffusion transfer photoprocessing techniques.

Other exterior components of the camera 10 shown in FIG. 1 include a tripod-mounted socket 32 located in the side wall 28 approximately midway along the length of the housing 14, a cable-type shutter release 34 mounted in the top wall 24 of the base 12, and a shutter timing device 36 supported on the top of the film back 16. A periscope-type viewfinder is provided by an objective mirror 38 mounted on the top wall 24 of the base 12 and aligned optically on a doubly-folded axis 40 with an eyepiece and mirror assembly 42 carried on the film back 16. While this form of viewfinder is particularly useful for framing images to be photographed with the camera supported solely by the base 12 on a flat surface S, it is contemplated that the viewfinding function may be accomplished when the camera 10 is supported from the tripod mount 32, for example, merely by sighting along the base 12. Alternatively, the base 12 may have an auxiliary viewfinder framing and sighting arrangement (not shown) for use in tripod mounting applications.

The base 12 houses an optical system generally designated by the reference numeral 44, the components of which will be described below with reference to FIGS. 2 and 3 of the drawings. As may be appreciated from the illustration in FIG. 1, however, the optical system 44 lies along a folded optical path comprising axis segments 46a and 46b beginning at an entrance opening or window 48 in the front wall 18 of the base 12 and extending through a right-angle fold at the juncture of the housing 14 with the base 12, upwardly to the film back 16.

The components of the system 44 are shown most clearly in FIGS. 2 and 3 and, in the order of image light travelling through the optical system 44, include a negative lens element 50, a positive lens element 52, and an objective lens 54. Following the objective lens 54 is a light baffle 55, defining an aperture 56, and a capping shutter 58. An image folding and reversing device, preferably an Amici prism 60, is positioned in the base 12 behind the shutter 58 and functions primarily to fold or redirect image light emerging from the aperture 56 through an angle of 90 degrees after which it travels along optical axis segment 46b. Light so redirected by the prism 60 passes through a filter 62, to be described in more detail below, to a film plane 64 defined in practice by a film unit (not shown) supported in the film back 16.

The lens elements 50 and 52 are structured in a well-known manner to constitute a simple reversed Galilean-type telescope which is afocal. As such, these lens elements function to establish the camera angular field of view and change the effective focal length of the objective lens 54 which is a fixed focus lens having a long focal length of 230 mm, for example, thereby accounting for the overall height of the camera 10.

In FIG. 3, for example, the size of the aperture 56 is greatly exaggerated for purposes of illustrating the path of imaging light on the optical axis segments 46a and 46b. In practice, the diameter of the aperture 56 is reduced to approximately the size of a pinhole. While the small size of the aperture may, in fact, be equated to that of a pinhole, the word "pinhole" in the camera art suggests an image-forming device. Therefore, the opening 56 is more aptly characterized as an extremely small fixed aperture by which the depth of focus attributed to the lens 54 is maximized and so that a subject positioned three inches or more from the window 48 will be properly focused at the film plane 64. The shutter 58, as indicated, is a capping shutter and as such may be a single blade pivotally supported, for example, for movement between fully opened and closed positions. Although the mechanism by which the shutter is actuated is not illustrated in the drawings, such mechanisms are well known in the art and need be capable only of moving the shutter to an open condition by actuation of the cable 34 and for closure after a time interval either by release of the cable 34 or by the timer 36.

As mentioned above, the film back 16, in practice, is adapted to receive a film pack containing a plurality of individual film units each having self-contained processing chemicals. Specifically, it is contemplated that the film units will be of a type in which the subject to be photographed will be recorded on a light sensitive negative from which the image is transferred to a separate positive print by diffusion transfer. Such films are available at film speeds of ASA 3000 and are panchromatic, i.e., sensitive to radiation over the full visible spectrum. Because of the transfer of the image at the film plane from a negative to a positive image, and to achieve proper orientation of the image in the final photographic positive, the image passing the aperture 56 is not only folded but is also reversed by the prism 60. Image reversal by an Amici prism is well known but may be duplicated by properly arranged mirror surfaces. For example, a pair of mirrors may be positioned to correspond to the two reflective surfaces of the Amici prism, or could preferably be positioned to correspond to the two reflective surfaces of a common pentaprism. Thus, the Amici prism 60, though preferred, is intended as an example of an acceptable image folding and reversing means.

The optical system shown in FIGS. 2 and 3 possesses several characteristics which are important to the achievement of realism in a photograph of a scale model. The reversed Galilean-type telescope provided by the lens elements 50 and 52, for example, effects a magnification of the subject to be photographed along essentially parallel light rays capable of being converted to a focused image at the film plane 64 by the simple objective lens 54. The magnification and image-forming function of the three-lens elements, moreover, accommodates the relatively large physical dimensions of the camera 10 and, in particular, the elongated light path along housing 14. Magnifications of approximately 0.33 are contemplated in practice and have the effect of increasing the angular field of view of the lens 54 to approximately 60 degrees. The optical system 44 is, moreover, an exceptionally inexpensive and easily manufactured system.

The reversed Galilean-type telescope provided in the optical system 44 is desirable for the reasons mentioned, as well as having additional characteristics such as low distortion and flat curvature of field. Low distortion in this instance is achieved through the use of an aspheric surface on the lens 50. Such systems exhibit a certain amount of lateral chromatic aberration which, because of the substantial length of the overall optical system between the lens 50 and the film plane 64, and the effect of divergence over that length, result in multiple images at the film plane 64. Moreover, the high-speed, black-and-white film contemplated for use in the camera 10 is sensitive to a relatively wide spectral latitude and thus capable of recording such individual images. The eliminate the potential for multiple images, the imaging light originating at the subject to be photographed is passed through the filter 62 to limit the spectral response of the film to the middle regions of the visible spectrum. In particular, the filter 62 is a green color correction filter, specifically a Wratten 56 or 57, and eliminates film response to the blue and red regions of the visible spectrum thereby preventing the formation of multiple images at the film plane 64.

The configuration of the body of the camera 10 is particularly suited for support of the camera directly on a flat horizontal surface, such as the surface S in FIG. 1. In this respect, the relatively long and narrow configuration of the base 12 together with the rearward location of the housing on the top wall 24 of the base 12 enables orientation of the base 12 in openings such as doorways or windows of the model to be photographed.

To facilitate support of the camera 10 by the base 12 on the model floor, while at the same time assuring proper elevation of the optical axis segment 46a above the supporting floor of the model, and to stabilize the camera 10 against unwanted vibration, the base 12 is adapted for use with one or more weighted shims 68 and 70 as shown in FIGS. 4 and 5 of the drawings. To secure the weighted shims to the bottom of the base 12, the bottom wall 26 of the base 12 is recessed relative to side rails 72 and 74, the inner edges of which are undercut to provide a dovetail-like formation 76. The front wall 18 of the base 12 extends to be flush with the bottom of the rails 72 and 74 so as to effect an abutment stop 78 against which the shim 68, for example, may be engaged to position the shim longitudinally relative to the body of the base 12.

The bottoms of the weighted shims 68 and 70 are similarly formed with dovetail configurations to receive complementing dovetail formations at the top of the weights respectively. Also, it will be noted that the weighted shims 68 and 70 have different vertical dimensions. This difference in height is arranged in practice so that use of the shims individually or in combination may achieve various elevations of the optical axis segment 46a above the floor of the model on which the base 12 is supported. Thus, in models of a scale representing the smallest scale with which the camera 10 is designed for use, neither shim 68 nor 70 will be used. Progressively larger scale models may be accommodated by first using the relatively thin weighted shim 68 alone, then the relatively thick weighted shim 70 alone and next by using both weighted shims 68 and 70 in the arrangement as shown in FIGS. 4 and 5 of the drawings. Also, it will be appreciated that additional weighted shims may be employed in the same manner. Where the camera 10 is used by support on a tripod boom connected at the socket 32, the weights 68 and 70 may be removed.

In use, whether the camera is supported by the base 12 or from the tripod mounting socket 32, exposure of film in the film back 16 is effected in a conventional manner by framing the subject to be photographed in the viewfinder eyepiece 42, and actuating the shutter 58 by means of the cable release 34. The viewfinding function is greatly facilitated by the elevation of the viewfinder eyepiece 42 above the optical axis segment 46a. Also, the positioning of the timer 36 on the film back facilitates operation thereof for time exposures of relatively long durations. In this respect, the small size of the aperture 56 coupled with relatively low level of illumination in a model will require exposure time intervals of longer duration than normal. The relatively high speed of the film contemplated for use in the camera 10, however, mitigates the necessity for extra-ordinarily long shutter closing times. Also, the ability of the camera to be supported firmly by the base 12 resting on a floor of the model together with the use of the weighted shims 68 and 70 accommodates time exposures of the length necessary for proper exposure of the high-speed film.

Thus, it will be appreciated that as a result of the present invention, a highly effective camera is provided for photographing scale models and by which the principal objective among others is completely fulfilled. It is contemplated and will be apparent to those skilled in the art from the preceding description that modifications and/or changes may be made in the disclosed embodiment without departure from the invention. Accordingly, it is to be expressly understood that the foregoing description and accompanying drawings are illustrative only, not limiting, and that the true spirit and scope of the present invention will be determined by reference to the appended claims.

What is claimed is:

1. A camera for photographing scale models from the perspective of a scale person observing the model, said camera comprising:

a narrow, pedestal-like base capable of support on a flat surface and including at one end thereof an opening for admitting light into said base;

an elongated upstanding housing supported in said base and diverging therefrom with increasing distance from said base so that the dimensions of said housing at its end distant from said base are substantially larger in area than the end thereof connected to said base;

a film back supported on said housing distant end and including means for facilitating supporting film in an exposure plane of moderately large format;

an optical system supported within said base and including aligned along an axis parallel to said base in line with said opening in said base:

(a) a small aperture for providing said camera with a depth of field ranging from a few inches to infinity to simulate the depth of field a scale camera in the hand of a scale person would have; and (b) an afocal component structured for increasing the angular field of view of said camera compared to what it would have with just said aperture and for minimizing distortion, said angular field of view approximating the visual field of a scale person observing a model; and optical means for defining a folded optical path between said optical system and said exposure plane so that light emerging from said optical system is caused to travel toward said exposure plane to form a properly oriented image therein.

2. The camera of claim 1 additionally including a periscope type viewfinder having an eyepiece presented at the top of said film back and an optical component for collecting scene light and having an optical axis disposed closely adjacent and parallel to said first element optical axis.

3. The camera of claim 2 wherein the viewing axis of said eyepiece is disposed in parallel relationship to said optical axis of said optical component.

4. The camera of claim 1 wherein at least a portion of said base defining the entrance to said optical system is minimized to facilitate its insertion into openings of scale models.

5. The camera of claim 1 wherein said afocal component comprises a reversed Galilean type telescope including a first negative lens element followed by a positive lens element with an aspheric surface to correct said component for distortion.

6. The camera of claim 5 wherein said component has a magnification of 0.33.

7. The camera of claim 1 wherein said optical system further includes a positive lens ahead of said small aperture.

8. The camera of claim 5 wherein said positive lens has a focal length of approximately 230 mm.

9. The camera of claim 1 wherein said afocal component is corrected for distortion but not for lateral chromatic aberration and wherein said camera further includes a color correction filter in said optical path to eliminate the formation of multiple images which would form in panchromatic film used with said camera because of said lateral chromatic aberrations.

10. A camera for photographing scale models from the perspective of a scale person observing the model said camera comprising:

a light-tight enclosure defined by a pedestal-like base having an objective optical system opening, an elongated upstanding housing supported by said base rearwardly from said opening, and a film back supported on top of said upstanding housing said film back establishing a film plane;

an optical system supported within said base and including an afocal, negative/positive lens pair followed by a long focal length objective lens element, a small aperture stop and image light folding means for redirecting image light passing said lens pair, said lens element and said aperture stop upwardly along said upstanding housing to said film plane, said optical system operating to simulate the depth of field and angular field a scale camera would have in the hands of a scale person in the model; and shutter means for exposing said film plane to light passing from said entrance opening to said film plane; and filter means supported in said upstanding housing, said filter means passing along spectral frequencies in an intermediate band of visible light.

11. A camera for photographing scale models, said camera comprising:

a pedestal-like base capable of support on a flat surface;

an optical system for forming an image of at least a portion of a model to be photographed, said optical system having a first element for initially receiving scene light and introducing it into said optical system, said first element being arranged in said base to have its optical axis horizontally aligned when said base is supported on the flat surface;

an elongated upstanding housing supported on said base;

a film back supported at the top of said housing;

means for defining a folded optical path between said optical system first element and said film back, said folded optical path having one leg optically aligned with said first element optical axis and another leg optically aligned with said film back so that scene light emerging from said first element and traveling along said optical path first leg is redirected for travel along said optical path second leg toward said film back; and at least one shim, said shim and said base being complementary configured so that said shim is removably mountable under said base to change the elevation of said first element optical axis with respect to the flat surface on which said base is supported.

12. The apparatus of claim 11 wherein said shim is weighted to stabilize support of said camera with said base supported on a flat surface.

* * * * *